Feb. 20, 1951 S. S. SARNAC 2,542,363
WHEEL SUSPENSION FOR VEHICLES
Filed Feb. 27, 1948
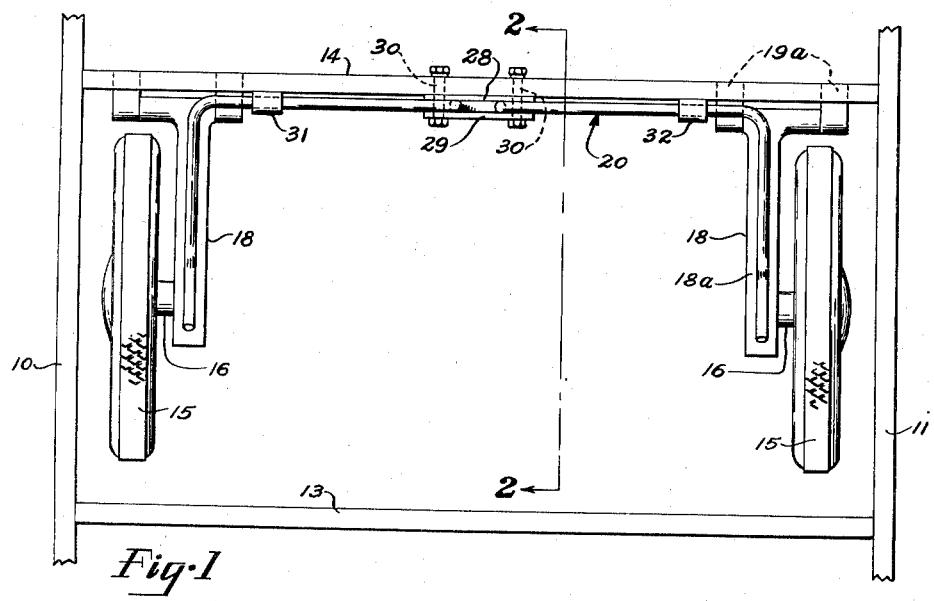
Fig.1
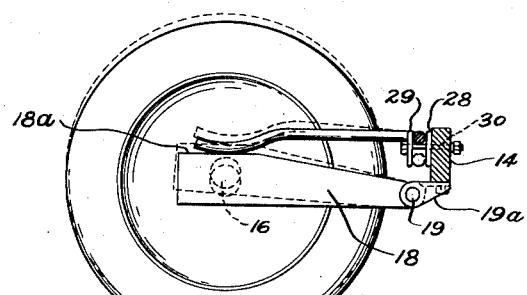
Fig.3
Fig.2
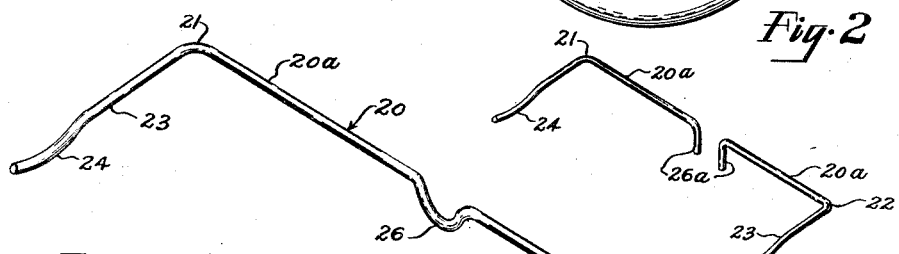
Fig.4
Fig.5
INVENTOR.
STEPHEN S. SARNAC
BY Fay, Golrick & Fay
ATTORNEYS Patented Feb. 20, 1951

2,542,363

UNITED STATES PATENT OFFICE 2,542,363

WHEEL SUSPENSION FOR VEHICLES

Stephen S. Sarnac, Fayette, Ohio

Application February 27, 1948, Serial No. 11,773

5 Claims. (Cl. 267—57)

This invention is directed to improvements in resilient mountings for vehicle wheels and the general object thereof is the provision of a deflectable wheel mounting for road vehicles, such as trailers, trailer trucks, etc., wherein the wheels are independently attached to the frame or chassis of the vehicle.

More specifically, the present invention is concerned with the provision of a trailer axle arrangement wherein each of a pair of wheels will have an independently deflectable axle mounting controlled by a combined free beam spring and torsion spring action in an effective and simple manner.

A still further object of the present invention is the provision of a trailing axle wheel mounting formed up of a minimum number of simple parts.

Other objects and advantages of the invention will be apparent from the following detailed description of preferred forms of embodiment of the invention, reference being made to the accompanying drawings wherein—

Fig. 1 is a plan view of part of a vehicle body or frame showing the manner of applying the invention thereto;

Fig. 2 is a side elevation of the wheel mounting taken substantially along the plane defined by line 2—2 of Fig. 1;

Fig. 3 is a side view of a spring rod which comprises one of the salient features of the invention;

Fig. 4 is a perspective view of the spring beams and torsion spring sections formed of a single spring rod; and Fig. 5 shows a slight modification of the form shown in Figs. 1 to 4, inclusive.

Various arrangements have been proposed heretofore, some of which have gone into use, for providing an independent or deflectable mounting for each wheel of a road vehicle, such as a pleasure trailer or a trailer truck and which, while providing the advantage of the independent wheel mounting, introduced other troublesome factors including increased cost. In the present invention the road wheels are carried by levers or wheel arms pivotally attached to the body or frame of the vehicle in a trailing fashion relative to the pivotal axis of the arm and a spring rod or spring rods is or are used which afford a combined beam spring or flat spring action with a torsion spring action in maintaining the arm and the road wheel axially mounted thereon in proper relation to the under side of the vehicle body. The spring structure is a very simple form and may comprise a spring rod of predetermined tensile and torsional strength which has formed therein a right-angled bend or bends, as the case may be, whereby the beam spring, while acting as such, also becomes a torsion lever acting upon the torsional part of the rod at right angles to the spring beam. The spring beam is of the free end type and is adapted to act upon some part of the wheel supporting arm in the region of the axis of the wheel. In the form of the invention shown the free end of the spring beam acts upon the top of the wheel-supporting arm so that should it be desired to change the wheel or remove it for tire repairs, elevating or jacking up of the body to a sufficient height will permit the separation of the spring beam and the top of the arm by the simple act of elevating the body relative to the road or other terrain supporting medium.

Referring to the drawings, in Fig. 1 is shown part of the body or chassis structure more or less diagrammatically to comprise side rails or sills 10 and 11, a rear cross-beam 13 and a second cross-beam 14 which carries the wheel mountings. Wheels 15 are mounted on side shafts or axles 16 carried on the wheel arms 18 adjacent the free ends thereof. The arms 18 are pivotally supported on pins 19 carried by brackets 19a attached to the under side of the cross-beam 14 adjacent the sides of the vehicle frame or body.

The spring rod comprising the resilient means of the wheel mounting may be in the form of a single continuous, generally U-shaped rod 20, as shown in Fig. 4, or may comprise a right-side and a left-side right-angle shaped spring rod member, as will be explained. The spring rod 20 for the present will be described as a single member having a right-angled bend at 21 and another right-angled bend at 22 to provide spring beam reaches 23. The outer end portions 24 of the reaches 23 are slightly concaved to bear upon the top flat surface 18a of the arms 18 in the general region of the axis of the wheels.

The shape of the spring rod 20 is such as to permit of its ready attachment to the cross-beam 14 at three points, namely, at points adjacent the bends 21 and 22 and at the central region where a deformation 26 is provided for securing the spring rod as a unit to the face of the cross-beam 14. Any convenient securing means may be utilized, such as an inner plate member 28 and an outer plate member 29 which serve as clamping members to engage the deformation 26. Bolt members 30, extending through the cross-beam 14, serve to cause the plates to firmly secure the central deformed region 26 of the spring rod structure to the cross-beam 14. Journal brackets 31 and 32 support the torsional sections 20a of the spring rods at a point adjacent to the right-angled bends 21 and 22, the journal brackets also along secured to the frame cross-beam 14.

Should it be desired to have the spring structure 20 made up of two right-angle formations the same can be utilized by having right-angled bends 26a formed as shown in Fig. 5 and the bends 26a would be engaged by the clamping plates 28 and 29 and by suitable means, such as anchoring bolts, to prevent sidewise shifting of the spring members.

In designing the spring formation 20 it will be understood that the spring beam sections 23 may be considered as flat spring arms theoretically anchored at points 21 and 22 but at which points in practice no torsional anchorage is effected. Thus, the torsional reaches 20a add a torsional spring effect to the beam spring effect of the reaches 23. It will also be understood that the plane of the deformation 26 will not be at right angles to the plane of the reaches 23, the relationship being as generally shown in Fig. 3 so that, when the frame or body of the vehicle is jacked up, the contact portion 24 will spring downwardly with the wheel arms 18 until all load is relieved therefrom, whereupon further elevating of the vehicle body or frame will permit the arms 18 to swing downwardly and away from the shoe portions 24 of the spring members. It will be obvious to those skilled in the art that the bracket 19a and other attaching means may take various forms. As shown in Fig. 1, the bracket 19a is such as to afford a hinge connection between the wheel-supporting arm 18 on the chassis or frame of the vehicle. It will also be apparent that the free ends of the spring rod may contact side pins or other parts of the arm 18 or the axle structure 16.

It will be obvious that the ararngement affords an independent mounting for each of the wheels 15 whereby the wheels may follow variations in the contour of the road or terrain and the entire arrangement involves the use of only the simplest of elements or parts.

Having thus described my invention, I claim:

1. The combination with a vehicle frame of a pair of free swinging lever arms having ends thereof pivotally connected to the frame adjacent each side of the frame to thereby provide an independent mounting for each of a pair of road wheels, bracket members on the frame for pivotally supporting the arms, a road wheel supported by a stud shaft on each arm located adjacent the outer free end of the arm, a spring rod of a general U-shape and wherein the legs of the U comprise free end beam spring sections in yieldable contact with the arms and the intermediate part comprises torsion spring sections extending from one side region to the other side region of the frame above the lever arms, journal brackets attached to the frame and supporting the torsion spring sections of the rod adjacent the beam spring sections thereof and an attaching means for rigidly securing the central part of the spring rod to the vehicle frame.

2. The combination with a vehicle frame or body of a pair of trailing wheel axle supporting arms in the form of levers each being pivotally connected at one end to the frame adjacent a side of the frame, a bracket for each arm secured to the frame for independently supporting each arm, a stud axle on each arm adjacent the free end thereof, a road wheel on the axle, a combined beam spring and torsion spring having generally a U-shape and attached to the vehicle frame above the pivotal axes of the arms with the beam sections thereof resiliently bearing upon the respective arms, attaching means securing the central part of the spring member to the vehicle frame to prevent torsional movement thereof and journal brackets attached to the vehicle frame and supporting the torsion sections of the spring above the pivotal axes of the arms so that the beam portions of the spring member act as beam springs and the central reaches of the spring member act as torsion springs in yieldingly resisting the deflecting movements of the wheel axle arms.

3. In a trailer axle wheel mounting the combination with a vehicle frame of a free swinging lever arm having an end thereof pivotally connected to the frame adjacent a side of the frame, a bracket member on the frame for pivotally supporting the arm, a road wheel supported by a stud shaft on the arm located adjacent the outer free end of the arm, a spring rod comprising a free end beam spring section, a torsion spring section extending at substantially a right-angle to the beam section and the beam spring section being located above the lever arm and in yieldable contact therewith, a journal bracket attached to the frame and supporting the torsion spring section of the rod adjacent the beam spring section thereof and an attaching means for rigidly securing the end region of the torsion section of the spring rod to the vehicle frame.

4. The combination with a vehicle frame of a free swinging lever arm having an end thereof pivotally connected to the frame adjacent a side of the frame to thereby provide an independent mounting for one of a pair of road wheels, a bracket member on the frame for pivotally supporting the arm, a road wheel supported by a stud shaft on the arm located adjacent the outer free end of the arm, a spring rod having a right-angle bend therein to provide a free end beam spring section and a torsion spring section and the beam spring section being located above the lever arm and in yieldable contact therewith, a journal bracket attached to the frame and supporting the torsion spring section of the rod adjacent the right-angle bend thereof and an attaching means for rigidly securing a part of the torsion section remote from the bend to the vehicle frame.

5. The combination with a vehicle frame or body having an under side cross beam of a pair of trailing wheel axle supporting arms in the form of flat top levers each being pivotally connected at one end to the cross-beam adjacent a side of the frame, a bracket for each arm secured to the cross-beam for independently supporting each arm, a stud axle on each arm adjacent the free end thereof, a combined beam and torsion spring for each arm in the form of a rod with right-angle bend to form the beam and the torsion parts thereof with the torsion parts attached to the frame cross-beam above the pivotal axis of the arms and having the beam portions thereof in resilient relation to the flat tops of the arms, attaching means securing the torsion parts of the spring rod members to the cross-beam and brackets attached to the cross-beam above the pivotal axes of the arms for journaling the torsion parts, whereby the beam portion of each spring member acts as a beam spring on the flat top of the lever and the mounted parts of the spring rod members act as torsion springs in conjunction with the action of the beam springs in yieldingly resisting the deflecting movement of the wheel axle arms.

STEPHEN S. SARNAC.

REFERENCES CITED

The following references are of record in the file of this patent:

UNITED STATES PATENTS

| Number | Name | Date |
|---|---|---|
| 171,401 | McKown | Dec. 21, 1875 |
| 225,334 | Brace | Mar. 9, 1880 |
| 352,071 | Shaw | Nov. 2, 1886 |
| 402,789 | Waterhouse | May 7, 1889 |
| 2,099,819 | Mercier | Nov. 23, 1937 |
| 2,297,465 | Froehlich | Sept. 29, 1942 |